US012563400B2

(12) United States Patent
Khare et al.

(10) Patent No.: US 12,563,400 B2
(45) Date of Patent: Feb. 24, 2026

(54) METHOD AND APPARATUS FOR LAWFUL INTERCEPTION FOR AKMA ROAMING ARCHITECTURE

(71) Applicant: Nokia Technologies Oy, Espoo (FI)

(72) Inventors: Saurabh Khare, Bangalore (IN); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 104 days.

(21) Appl. No.: 18/474,467

(22) Filed: Sep. 26, 2023

(65) Prior Publication Data

US 2024/0114345 A1 Apr. 4, 2024

(30) Foreign Application Priority Data

Sep. 29, 2022 (IN) .............................. 202241055934

(51) Int. Cl.
| | |
|---|---|
| *H04L 29/06* | (2006.01) |
| *H04L 9/08* | (2006.01) |
| *H04L 9/32* | (2006.01) |
| *H04W 12/80* | (2021.01) |

(52) U.S. Cl.
CPC ............. *H04W 12/80* (2021.01); *H04L 9/085* (2013.01); *H04L 9/32* (2013.01)

(58) Field of Classification Search
None
See application file for complete search history.

(56) References Cited

U.S. PATENT DOCUMENTS

| | | | | | |
|---|---|---|---|---|---|
| 12,143,812 | B2 * | 11/2024 | Kunz | ................ | H04W 12/0431 |
| 2017/0359322 | A1 * | 12/2017 | Zhang | ................... | H04W 12/02 |
| 2019/0260803 | A1 * | 8/2019 | Bykampadi | ........... | H04L 63/168 |
| 2021/0400475 | A1 * | 12/2021 | Lehtovirta | ............ | H04W 12/04 |
| 2022/0210636 | A1 | 6/2022 | Gupta et al. | | |
| 2022/0368684 | A1 * | 11/2022 | You | ........................ | H04L 69/16 |
| 2023/0115314 | A1 * | 4/2023 | Srivastava | ........ | H04W 12/0433 |
| | | | | | 726/2 |
| 2023/0199483 | A1 * | 6/2023 | Kunz | ................... | H04L 9/0866 |
| | | | | | 713/171 |

(Continued)

OTHER PUBLICATIONS

"Regulatory LI compliance of Akma", 3GPP SA3 LI #78e-d, S3i200477, SA3-LI, Aug. 25-26, 2020, 2 pages.

(Continued)

*Primary Examiner* — Maung T Lwin
(74) *Attorney, Agent, or Firm* — Ryan, Mason & Lewis, LLP

(57) ABSTRACT

A method, apparatus, and computer program for receiving an application session establishment request comprising an authentication and key management for applications, AKMA, Key Identifier, A-KID; producing an application key request (Naanf_AKMA_ApplicationKey_Get_request) comprising information elements AKMA Key Identifier A-KID; an application function identifier, AF_ID; and an application encryption key indication (Nnef_AKMA_AF_Encryption_Key_Indication); and sending the produced application key request (Naanf_AKMA_ApplicationKey_Get_request) to a home AKMA anchor function, hAAnF, or to a network exposure function, NEF, for enabling lawful interception in the VPLMN.

13 Claims, 3 Drawing Sheets

(56)                    References Cited

U.S. PATENT DOCUMENTS

| | | | | |
|---|---|---|---|---|
| 2023/0209337 A1* | 6/2023 | Guo | H04W 60/04 | |
| | | | 455/410 | |
| 2023/0283465 A1* | 9/2023 | Bathula | H04L 9/0894 | |
| | | | 713/164 | |

OTHER PUBLICATIONS

"3rd Generation Partnership Project; Technical Specification Group Services and System Aspects; Generic Authentication Architecture (GAA); Access to network application functions using Hypertext Transfer Protocol over Transport Layer Security (HTTPS) (Release 17)", 3GPP TS 33.222, V17.2.0, Jun. 2022, 37 pages.
"New SID on enhancement of Akma", 3GPP TSG-SA3 Meeting #106-e, S3-220262, Agenda: 4.18, China Mobile, Feb. 14-25, 2022, 3 pages.
"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.6.0, Jun. 2022, 25 pages.
"3rd Generation Partnership Project; Technical Specification Group Services and System Aspects; Study on Authentication and Key Management for Applications (AKMA) phase 2 (Release 18)", 3GPP TR 33.737, V18.1.0, Sep. 2023, pp. 1-48.
"3rd Generation Partnership Project; Technical Specification Group Services and System Aspects; Study on home network triggered primary authentication (Release 18)", 3GPP TR 33.741, V18.0.1, Apr. 2023, 38 pages.
"solution 1 updates for external AF", 3GPP TSG-SA3 Meeting #108Adhoc-e, S3-222938, Agenda: 5.6, Nokia, Oct. 10-14, 2022, 4 pages.
"solution 1 updates", 3GPP TSG-SA3 Meeting #108Adhoc-e, S3-222934, Agenda: 5.7, Nokia, Oct. 10-14, 2022, 5 pages.
Extended European Search Report received for corresponding European Patent Application No. 23199458.3, dated Feb. 12, 2024, 10 pages.
"Solution on AKMA roaming", 3GPP TSG-SA3 Meeting #107Adhoc-e, S3-221634, Agenda: 5.6, Nokia, June 27-Jul. 1, 2022, 3 pages.

\* cited by examiner

Fig. 3

METHOD AND APPARATUS FOR LAWFUL INTERCEPTION FOR AKMA ROAMING ARCHITECTURE

TECHNICAL FIELD

Various example embodiments relate to lawful interception for AKMA roaming architecture.

BACKGROUND

This section illustrates useful background information without admission of any technique described herein representative of the state of the art.

Authentication and Key management for Applications based on 3GPP credentials, AKMA, is being standardized. For example, clause 4.2 of 3GPP TS 33.535 V17.6.0 specifies that the following network elements are parts of AKMA architecture: an AKMA anchor function, AAnF, an application function, AF, a network exposure function, NEF, an authentication server function, AUSF, and a unified data management, UDM. Clause 4.3 of 3GPP TS 33.535 V17.6.0 specifies that the following service-based interfaces, SBIs, are involved in the AKMA architecture: a service-based interface exhibited by the NEF, Nnef, a service-based interface exhibited by the UDM, Nudm, and a service-based interface exhibited by the AAnF, Naanf. The AKMA architecture has been used as a solution to protect communication between user equipment, UE, and the AF, in the scenarios of proximity-based services, ProSe, and message service for massive internet of things, MioT, over the 5G System, MSGin5G. Roaming aspects have not been adequately addressed in the current release of 3GPP 17. In particular, it is desirable to standardize a new roaming architecture for the AKMA. It is further desirable that the new AKMA roaming architecture provides support for lawful interception.

An authentication proxy is missing in the AKMA. The authentication proxy in the AKMA could help to improve cost effectiveness and relieve the application servers, AS, of some security tasks.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

BRIEF DESCRIPTION OF THE DRAWINGS

For a more complete understanding of example embodiments of the present invention, reference is now made to the following descriptions taken in connection with the accompanying drawings in which:

FIG. 3 shows a simplified signaling diagram of some features of example embodiments related to an external AF.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
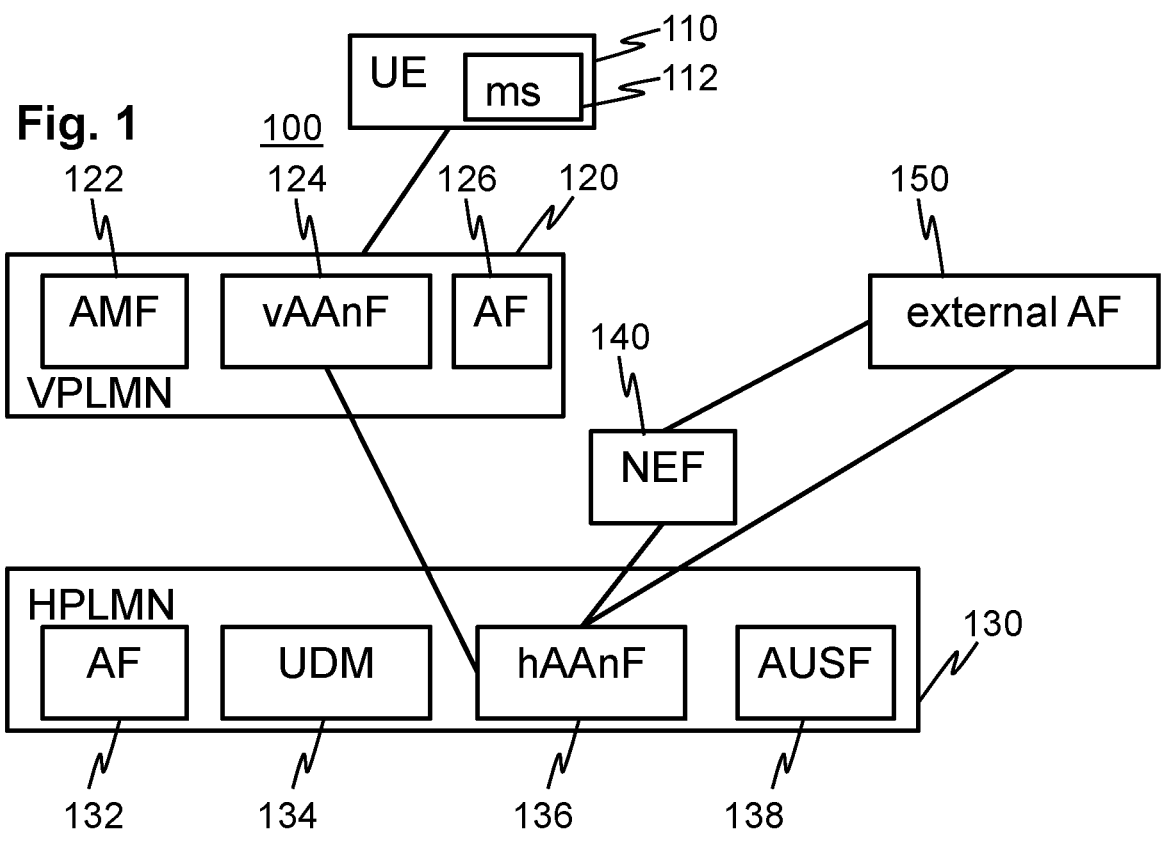
FIG. 1 shows an architectural drawing of a system of an example embodiment.

FIG. 1 shows an architectural drawing of a system of an example embodiment. In FIG. 1, user equipment, UE, 110 with a mobile subscription 112 is roaming in a visited network that is a visited public land mobile network, VPLMN 120. The home and visited networks depend on the subscription used by the UE and vary for different subscriptions. The VPLMN 120 comprises normal structures and functionalities to support 3GPP 5G operations. It is useful for understanding some embodiments of present disclosure to note following parts of the VPLMN: an access and mobility management function 122; a visited PLMN AKMA anchor function, vAAnF, 124; and an internal application function, AF, 126 of the VPLMN. FIG. 1 further comprises a home public land mobile network, HPLMN 130 of the subscription 112 in use by the user equipment 110. Among others, the HPLMN 130 comprises an internal Application Function, AF, 132; a unified data management 134; a home PLMN akma anchor function, hAAnF, 136; and an authentication server function, AUSF, 138. The system 100 further comprises a network exposure function, NEF, 140; and an external AF 150.

In a 5G core network, 5GC, there may remain some operational and security issues in the roaming architecture for the AKMA. In this document, various embodiments are disclosed for providing for lawful interception, LI.

a) when the UE 110 is in the VPLMN 120 and the internal AF 132 of the HPLMN is used by the UE 110; or b) when the UE 110 is in the VPLMN 120 and the external AF 150 is used by the UE 110.

In case a), the HPLMN 130 should enable decrypting the user services for LI purposes, e.g., by issuing on an authorized LI request an AKMA encryption key to a function assigned for this purpose, such as a User Plane Function, UPF (not shown). To this end, an encryption key and further information may be needed, such as replay attack protectors (nonces) applied, counters, and/or indication of a cipher algorithm used. In an example embodiment, application encryption key material term comprises the AKMA encryption key or the information required for the hAAnF or the vAAnF to produce the AKMA encryption key and any further information required to decrypt the encrypted data. In case of simplicity, the AKMA encryption key refers herein to the information with which the AKMA encryption can be decrypted.

In case b), the HPLMN 130 has no internal access to the AKMA encryption key. Instead, in an example embodiment, the external AF 150 indicates how the AKMA encryption key is formed so that the HPLMN 130 may be able to obtain the AKMA encryption key. In an example embodiment, the external AF 150 sends the application encryption material to the NEF 140 and the NEF 140 either obtains the AKMA encryption key or passes the application encryption material to the HPLMN 130 or to the VPLMN 120.

There are three main cases for the AKMA encryption key: 1) using an AKMA Application Key, $K_{AF}$; 2) using a derivative of the $K_{AF}$; and 3) using a special key that is independent of the $K_{AF}$.

In deriving the AKMA encryption key from the $K_{AF}$, the AKMA encryption key can be derived, e.g., by a key derivation function or by encrypting at least the $K_{AF}$ or a portion thereof and optionally some further information, such as a sequence counter, timestamp, or a nonce. For example, the derived AKMA encryption key can be formed with a key derivation function from concatenated or otherwise combined $K_{AF}$ and the nonce. The key derivation function may be advantageous in its processing cost.

The third case may arise particularly when an independently operating data center or computer cloud implements the external AF. In such a case, the neither the HPLMN nor the VPLMN can provide for the LI unless the external AF provides for such capabilities. In an example embodiment where the AKMA encryption key is based on the $K_{AF}$, the external AF sends an indication via the NEF to the hAAnF. If this indication is set, the hAAnF will push the AKMA encryption key to the vAAnF or to the VPLMN. Otherwise, if this indication is not set, i.e., external AF is using the special key, the hAAnF informs the VPLMN that the AKMA encryption key is not available to the HPLMN. On the other hand, if the external AF needs to send the AKMA encryption key to the vAAnF, then it is passed to the NEF and routed therefrom via the hAAnF to vAAnF. In an example embodiment, instead of the external AF sending the AKMA encryption key, the AAnF fetches the AKMA encryption key from the external AF and provides same to the vAAnF of the VPLMN. It is further possible that the special key is not issued by the external AF when requested by the HPLMN. In that case, the HPLMN may simply indicate to the VPLMN that the AKMA encryption key is not available.

Figure 2:
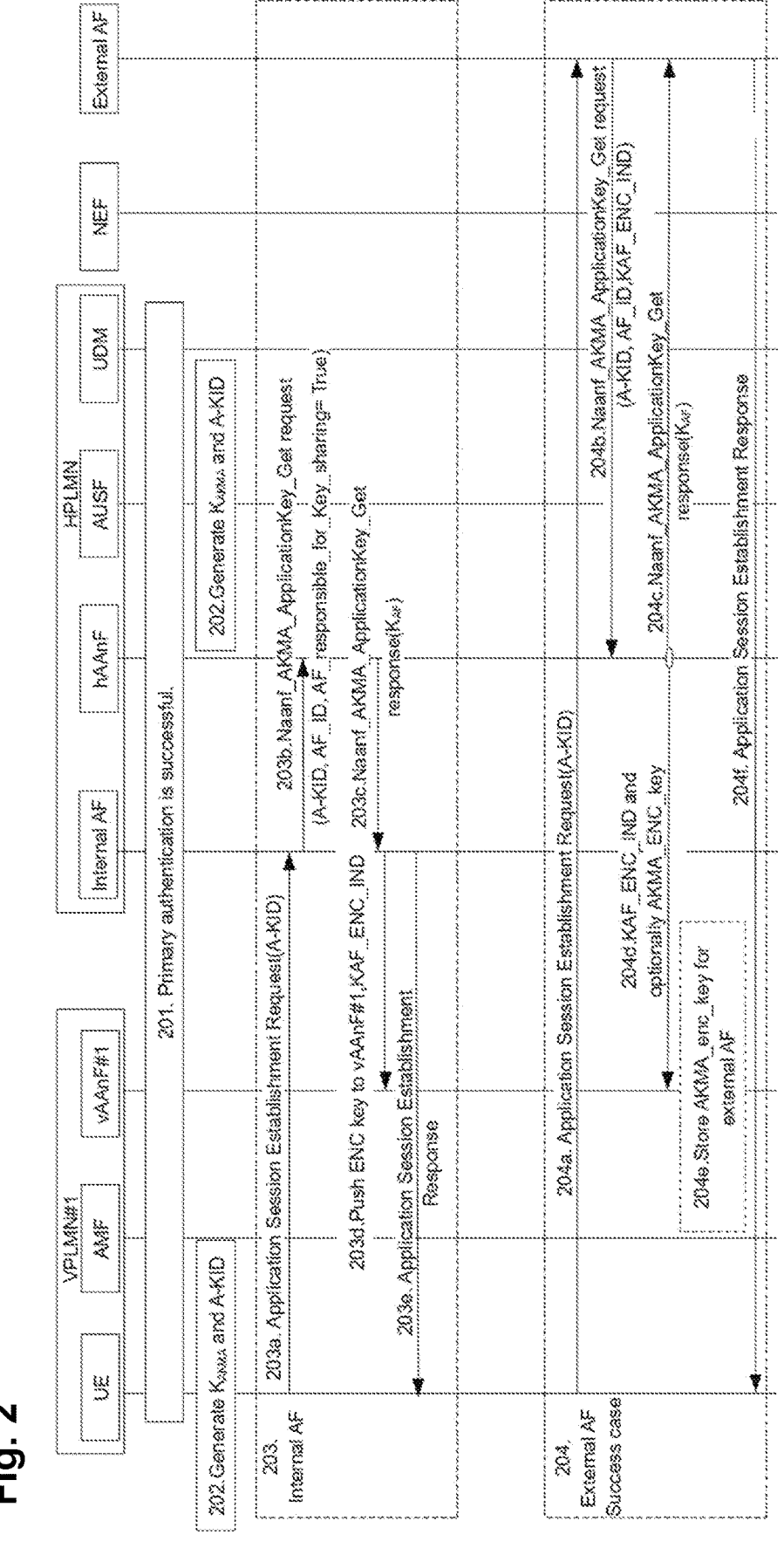
FIG. 2 shows a simplified signaling diagram of some features of example embodiments related to using an internal application function, AF of a home public land mobile network, HPLMN, and a remote AF.

FIG. 2 shows a simplified signaling diagram of some features of example embodiments related to using the internal AF of the HPLMN and the external AF. In FIG. 2, some particularly interesting information elements are indicated. However, it should be appreciated that in some example embodiments, not all the drawn information elements are transferred. FIG. 2 illustrates:

201: Successfully performing a primary authentication by the UE through the VPLMN with the HPLMN. Hence, the UE gains mobile connectivity.

202: Generating an AKMA anchor key, $K_{AKMA}$, and an AKMA key identifier, A-KID, by the UE and by the AUSF of the HPLMN. In the HPLMN, the AUSF informs the hAAnF of the $K_{AKMA}$ and the A-KID.

203: This is a process of an example embodiment wherein the internal AF of the HPLMN is used.

203a: The UE sends an application session establishment request with the A-KID to the internal AF.

203b: The internal AF then sends an application key request (Naanf_AKMA_ApplicationKey_Get_request) to the hAAnF. In an example embodiment, the application key request comprises the A-KID, the AF_ID, and a key sharing responsibility indication AF_responsible_for_Key_sharing set to Boolean value True.

203c: The hAAnF responds with an application key response message (Naanf_AKMA_ApplicationKey_Get_response). In an example embodiment, the application key response message comprises the $K_{AF}$.

203d: The internal AF pushes the AKMA encryption key to the vAAnF with an application encryption indication (KAF_ENC_IND), and 203e: The internal AF also sends an application session establishment response message to the UE. The application encryption indication (KAF_ENC_IND) of the previous step indicates by a first value (e.g., 1) that the $K_{AF}$ is used as an AKMA encryption key; by a second value (e.g., 2), that a derivative of the $K_{AF}$ is used as the AKMA encryption key; and by a third value (e.g., 3) that a special key independent of the $K_{AF}$ is used as the AKMA encryption key.

204: This is a process of an example embodiment wherein the external AF of the HPLMN is used.

204a: The UE sends an application session establishment request with the A-KID to the external AF, as in 203a to the internal AF.

204b: The external AF produces and sends an application key request (Naanf_AKMA_ApplicationKey_Get_request) comprising the A-KID; the AF_ID; and the application encryption indication (KAF_ENC_IND) explained in connection with step 203d.

204c: The hAAnF responds to the external AF with the application key response. In an example embodiment, the application key response comprises the $K_{AF}$.

204d: The hAAnF pushes or otherwise provides the $K_{AF}$ to the vAAnF together with the application encryption indication (KAF_ENC_IND).

Figure 3:
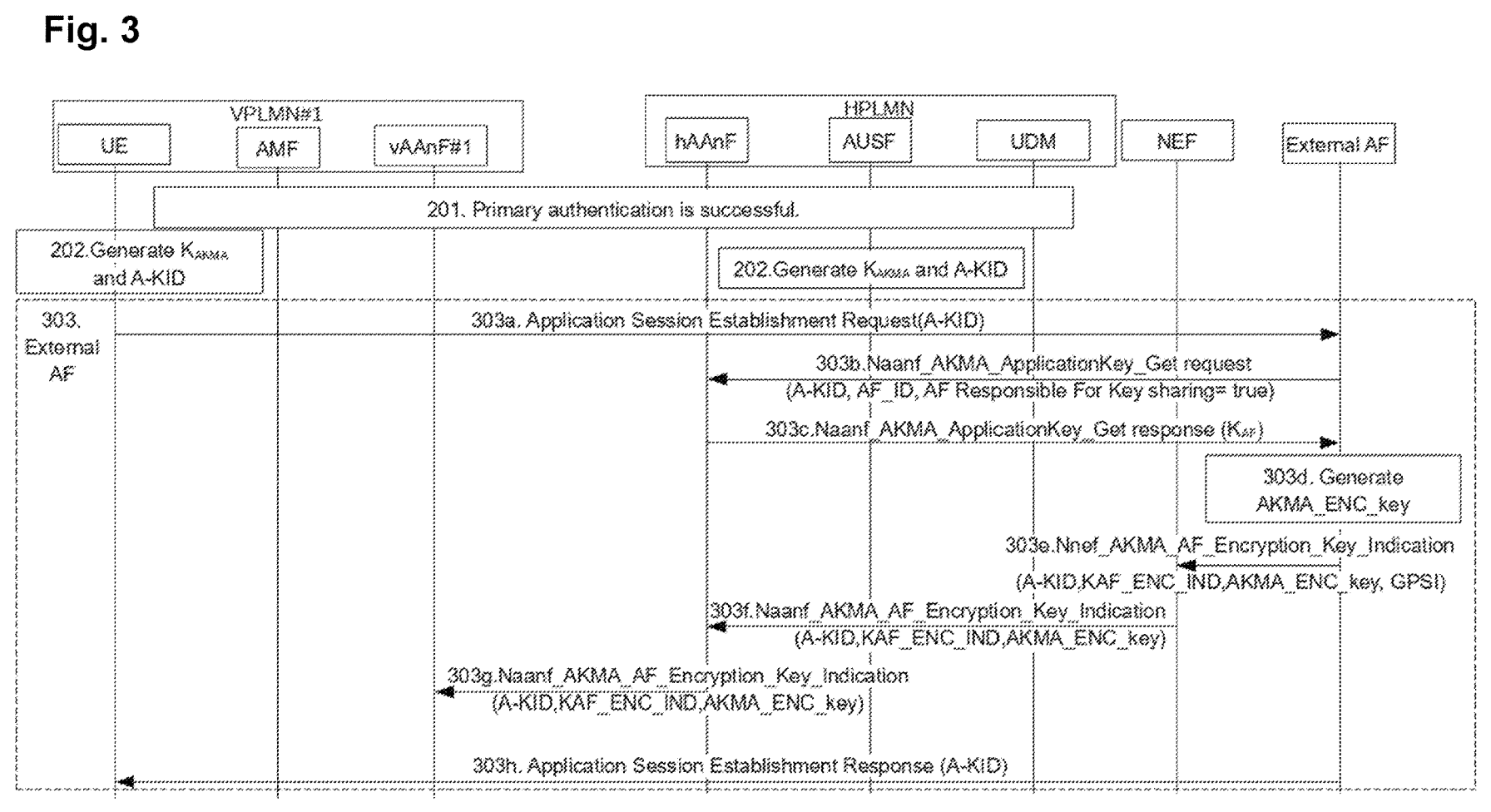

In an example embodiment, if the indication value received at hAAnF has a third value (e.g., 3), indicating that a special AKMA encryption key is used for encryption', the hAAnF shall provide only the indication to VPLMN without any keys, unless the hAAnF has received the special AKMA encryption key from the NEF. FIG. 3 shows an example embodiment in which the external AF has provided the NEF with the special AKMA encryption key and the same has been forwarded by the NEF to the hAAnF.

The application encryption indication provides certainty on the key material delivered by HPLMN to VPLMN. Without this indication, the VPLMN could not be certain whether the $K_{AF}$ is used as the AKMA encryption key or a $K_{AF}$ derivative is used for as the AKMA encryption key, or a key independent of $K_{AF}$ is used as the AKMA encryption key.

204e: The vAAnF stores the AKMA encryption key for enabling a subsequent lawful interception.

204f: The external AF sends an application session establishment response message to the UE, as the internal AF in 203e.

FIG. 3 shows a simplified signalling diagram of some features of example embodiments related to an external AF, comprising steps:

201-202: as in FIG. 2.

303: This is a process of an example embodiment wherein the external AF is used.

303a: The UE sends an application session establishment request with the A-KID to the external AF.

303b: The external AF sends the application key request, (Naanf_AKMA_ApplicationKey_Get_request) to the hAAnF. In an example embodiment, the application key request comprises the A-KID, the AF_ID, and a key sharing responsibility indication AF_responsible_for_Key_sharing set to Boolean value True. Based on this indication, AAnF does not share any key to VPLMN.

303c: The hAAnF responds with the application key response (Naanf_AKMA_ApplicationKey_Get_response) message with $K_{AF}$ to the external AF.

303d: The external AF generates the AKMA encryption key.

303e: The external AF sends an encryption key indication message (Nnef_AKMA_AF_Encryption_Key_Indication) to the NEF. Note: as the interface here is the Nnef, the message is accordingly named as the Nnef_AKMA_AF_Encryption_Key_Indication. In an example embodiment, the encryption key indication message comprises the A-KID, KAF_ENC_IND, AKMA_ENC_key and GPSI. Note: if the external AF has formed the AKMA_ENC_key of or based on the $K_{AF}$, AKMA_ENC_key may be omitted in an example embodiment. In another example embodiment, the KAF_ENC_IND is omitted.

303*f*: The NEF forwards the AKMA encryption key (AKMA_ENC_KEY) by an encryption key indication message (Naanf_AKMA_AF_Encryption_Key_Indication) to the hAAnF.

303*g*: the hAAnF sends the KAF_ENC_IND and/or the AKMA encryption key by an encryption key indication message (Naanf_AKMA_AF_Encryption_Key_Indication) to the vAAnF. In an example embodiment, this message further comprises the A-KID.

303*h*: At some point of time, the external AF sends the Application session establishment response to the UE.

Figure 4:
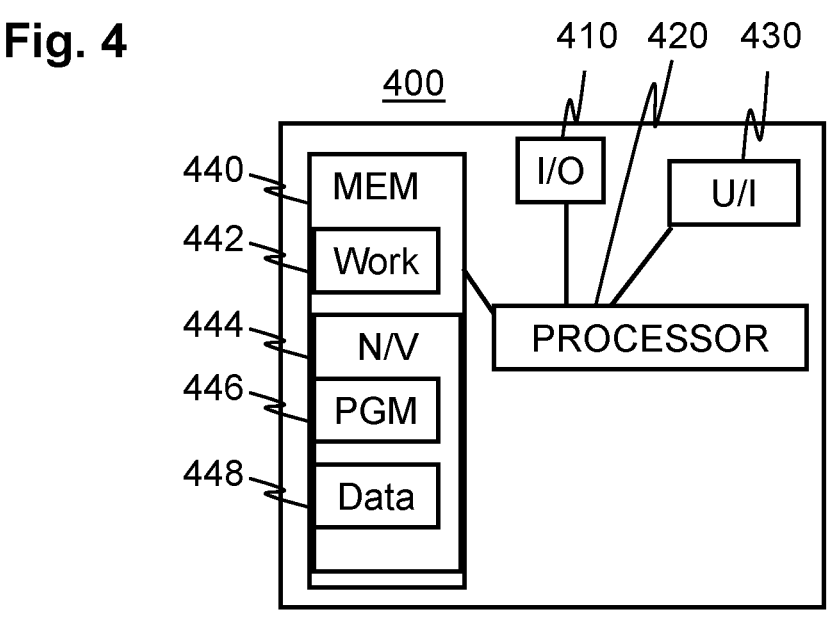
FIG. 4 shows a block diagram of an apparatus of an example embodiment.

FIG. 4 shows a block diagram of an apparatus 400 according to an embodiment of the invention. In an example embodiment, the apparatus 400 is used to implement one or more of the network functions or the UE. Moreover, it is possible that the apparatus 400 be used to implement one or more network functions for a given number or particular users. For example, the hAAnF may be implemented for one user by the apparatus 400 and with other equipment for another user.

The apparatus 400 comprises at least one memory 440 comprising instructions 446 and/or data 448. The at least one memory 440 may comprise non-volatile memory 444 and/or main memory 442. The apparatus 400 further comprises at least one processor 420 configured to execute the instructions 446 stored in the at least one memory 440 for controlling the operation of the apparatus 400, and at least one communication unit 410 for communicating with other nodes. The instructions 446 and/or the data 448, or parts thereof, may be transferred by the at least one processor 420 between the non-volatile memory 444 and the main memory 442. The at least one memory 440 may comprise random access memory (RAM) and/or read-only memory (ROM). The at least one memory 440 may comprise at least one RAM chip, and/or at least one ROM chip, and/or at least one flash memory chip. The at least one memory 440 may comprise solid-state, magnetic, and/or optical memory, for example. The at least one memory 440 may be at least in part accessible to the at least one processor 420. The at least one memory 440 may be at least in part external to the apparatus 400. The at least one communication unit 410 may comprise, for example, at least one of: a local area network (LAN) port; a wireless local area network (WLAN) unit; a Bluetooth unit; a cellular data communication unit; or a satellite data communication unit. The at least one processor 420 may comprise, for example, any one or more of: a master control unit (MCU); a microprocessor; a digital signal processor (DSP); an application specific integrated circuit (ASIC); a field programmable gate array; or a microcontroller. The apparatus may comprise a user interface 430, such as a keyboard and/or a graphical user interface (GUI).

The apparatus 400 as drawn can be a dedicated computer or server computer, for example. In an example embodiment, the apparatus is implemented using cloud computing such that the apparatus comprises a plurality of processors and memories that implement a large number of different functionalities including, for example, one or more of the network functions described in the foregoing. The apparatus can further support virtualization such that one or more of the different functionalities provided by the apparatus may be implemented on a virtualization platform, comprising for example one or more virtualized computers, virtualized computer servers, and/or virtualized network entities running on one or more virtualization servers.

As used in this application, the term "circuitry" may refer to one or more or all of the following:

(a) hardware-only circuit implementations (such as implementations in only analog and/or digital circuitry) and;

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that lawful interception support can be improved in 5G networks. Another technical effect of one or more of the example embodiments disclosed herein is that processing related to application function encryption may be reduced for roaming UE.

Embodiments of the present invention may be implemented in software, hardware, application logic or a combination of software, hardware, and application logic. In an example embodiment, the application logic, software, or an instruction set is maintained on any one of various conventional computer-readable media. In the context of this document, a "computer-readable medium" may be any transitory or non-transitory media or means that can contain, store, communicate, propagate, or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. An apparatus comprising:

at least one processor; and at least one memory storing instructions that, when executed by the at least one processor, cause the apparatus at least to perform:

receiving, from user equipment, an application session establishment request, the application session establishment request comprising a key identifier, the key identifier comprising an Authentication and Key Management for Applications (AKMA) Key Identifier (A-KID);

producing an application key request, the application key request comprising the A-KID, an application function identifier (AF_ID), and a key sharing responsibility indication of a home AKMA Anchor Function (hAAnF), of a home public land mobile network (HPLMN) of a mobile operator whose cellular subscription is in use by the user equipment, the key sharing responsibility indication specifying whether or not the hAAnF should share application encryption key material;

sending the application key request to the hAAnF;

receiving an application key response responsively to the sending of the application key request to the hAAnF, the application key response comprising an AKMA Application Key ($K_{AF}$);

producing application encryption key material, based at least on the received application key response; and providing, to a visited AKMA Anchor Function (vAAnF) of a visited public land mobile network (VPLMN) that the user equipment is attached to, an application encryption indication (KAF_ENC_IND) and the application encryption key material, the KAF_ENC_IND and the application encryption key material enabling lawful interception in the VPLMN.

2. The apparatus of claim 1, wherein the apparatus is an application function of the HPLMN.

3. The apparatus of claim 1, wherein:

responsive to the $K_{AF}$ being used as an AKMA encryption key, assigning a first value to KAF_ENC_IND;

responsive to a derivative of the $K_{AF}$ being used as the AKMA encryption key, assigning a second value to KAF_ENC_IND; and responsive to a special key independent of the $K_{AF}$ being used as the AKMA encryption key, assigning a third value to KAF_ENC_IND.

4. An apparatus, wherein the apparatus is a visited Authentication and Key Management for Applications (AKMA) Anchor Function (vAAnF) of a visited public land mobile network (VPLMN), the apparatus comprising:

at least one processor; and at least one memory storing instructions that, when executed by the at least one processor, cause the apparatus at least to perform:

receiving from another AKMA Anchor Function or from an application function, an application encryption indication (KAF_ENC_IND) and application encryption key material, the KAF_ENC_IND and the application encryption key material enabling lawful interception in the VPLMN; and providing a decrypting entity with the application encryption key material or an AKMA encryption key determined using the application encryption key material, responsively to receiving a request from an authorized entity to enable lawful interception.

5. The apparatus of claim 4, wherein the at least one memory and the instructions, when executed by the at least one processor, further cause the apparatus at least to perform:

determining the AKMA encryption key based on at least one of the application encryption key material and a value of KAF_ENC_IND.

6. The apparatus of claim 5, wherein determining the AKMA encryption key further comprises:

responsive to the value of KAF_ENC_IND indicating that the $K_{AF}$ is to be used as the AKMA encryption key, obtaining the $K_{AF}$ from the application encryption key material;

responsive to the value of KAF_ENC_IND indicating that the AKMA encryption key is derived from the $K_{AF}$, obtaining source data from which the AKMA encryption key is derived from the $K_{AF}$ from the application encryption key material;

responsive to the value of KAF_ENC_IND indicating that the $K_{AF}$ is not used for encryption, obtaining a special key independent of the $K_{AF}$ to use as the AKMA encryption key.

7. The apparatus of claim 4, wherein:

responsive to KAF_ENC_IND indicating that the $K_{AF}$ is used as the AKMA encryption key, providing the decrypting entity with the AKMA encryption key;

responsive to KAF_ENC_IND indicating that the AKMA encryption key is derived from the $K_{AF}$, providing the decrypting entity with at least one of:

the AKMA encryption key derived from the $K_{AF}$; and the application encryption key material from which the AKMA encryption key is derivable using the $K_{AF}$; and responsive to KAF_ENC_IND indicating that the $K_{AF}$ is not used for encryption, providing the decrypting entity with an indication that the KAF is not used for encryption.

8. The apparatus of claim 7, wherein providing the decrypting entity with the indication that the $K_{AF}$ is not used for encryption further comprises providing the decrypting entity with a special encryption key.

9. An apparatus comprising:

at least one processor; and at least one memory storing instructions that, when executed by the at least one processor, cause the apparatus at least to perform:

receiving an application session establishment request comprising an Authentication and Key Management for Applications (AKMA) Key Identifier (A-KID);

producing an application key request comprising the A-KID, an application function identifier (AF_ID), and an application encryption key indication (KAF_ENC_IND); and sending the produced application key request to a home AKMA Anchor Function (hAAnF) or to a network exposure function (NEF) for enabling lawful interception in a visited public land mobile network (VPLMN).

10. The apparatus of claim 9, wherein the at least one memory and the instructions, when executed by the at least one processor, further cause the apparatus at least to perform:

receiving, responsively to the sent application key request, an application key response comprising an AKMA Application Key ($K_{AF}$).

11. The apparatus of claim 10, wherein the at least one memory and the instructions, when executed by the at least one processor, further cause the apparatus at least to perform:

generating an AKMA encryption key using the $K_{AF}$, responsively to the receiving of the application key response.

12. The apparatus of claim 11, wherein the at least one memory and the instructions, when executed by the at least one processor, further cause the apparatus at least to perform:

generating an application function encryption key indication message comprising the A-KID, the AKMA encryption key, and a generic public subscriber identifier; and sending the application function encryption key indication message to the NEF.

13. The apparatus of claim 11, wherein the at least one memory and the instructions, when executed by the at least one processor, further cause the apparatus at least to perform:

deriving the AKMA encryption key from application encryption key material comprising the AKMA Application Key ($K_{AF}$);

wherein producing the application key request comprises including the application encryption key material in the application key request.

* * * * *